United States Patent
Aoyama et al.

[11] Patent Number: 6,117,014
[45] Date of Patent: Sep. 12, 2000

[54] VIDEO GAME MACHINE, ACTION SCORING METHOD IN VIDEO GAME, AND RECORDING MEDIUM ON WHICH ACTION SCORING PROGRAM IS RECORDED

[75] Inventors: Kazuhiro Aoyama, Kakogawa; Hideyuki Fujiwara, Neyagawa, both of Japan

[73] Assignee: Konami Co., Ltd., Hyogo-ken, Japan

[21] Appl. No.: 09/193,535

[22] Filed: Nov. 17, 1998

[30] Foreign Application Priority Data

Nov. 20, 1997 [JP] Japan ................................. 9-320195

[51] Int. Cl.[7] .................................................. A63F 9/22
[52] U.S. Cl. ........................... 463/43; 463/30; 463/31; 463/32; 463/33; 463/34
[58] Field of Search .................................. 463/43, 8, 30, 463/31, 36, 37, 38, 39, 44, 1, 2; 273/148 B

[56] References Cited

U.S. PATENT DOCUMENTS

| | | | |
|---|---|---|---|
| 5,649,861 | 7/1997 | Okano et al. | 463/30 X |
| 5,785,597 | 7/1998 | Shinohara | 463/40 X |
| 5,791,994 | 8/1998 | Hirano et al. | 463/43 X |
| 5,947,823 | 9/1999 | Nimura | 463/32 X |
| 5,984,786 | 11/1999 | Ehrman | 463/42 X |
| 6,001,017 | 12/1999 | Okano et al. | 463/43 X |

*Primary Examiner*—Lee Young
*Assistant Examiner*—Binh-An Nguyen
*Attorney, Agent, or Firm*—Jordan and Hamburg LLP

[57] ABSTRACT

In a video game machine, a character's action is scored according to whether or not a game player operates an operation unit at a suitable timing. An action selecting control function urges the game player to select an action. A command specifying control function specifies a command representing a combination of operations to be performed by the game player when a competitor reaches a predetermined distance from a course lip of a half-pipe course and causes a display unit to display the specified combination of operations corresponding to the selected action. A command input determining function determines whether the specified command has been input before the competitor reaches the course lip. An action conducting control function causes the competitor to conduct the selected action when the specified command is input. A scoring control function scores the competitor's action in view of five performance elements.

9 Claims, 6 Drawing Sheets

VIDEO GAME MACHINE, ACTION SCORING METHOD IN VIDEO GAME, AND RECORDING MEDIUM ON WHICH ACTION SCORING PROGRAM IS RECORDED

BACKGROUND OF THE INVENTION

1. Field of the Invention

The present invention relates to a video game machine using, for example, a cassette-type recording medium, such as an optical disc, a magnetic disk, or a semiconductor memory, on which program data is recorded. The invention is also concerned with an action scoring method for use in a video game, and to a recording medium on which an action scoring program is recorded.

2. Description of the Related Art

Hitherto, many kinds of game systems have been proposed. For example, one type of game system is formed of a home-use game machine and a television monitor. Another type of game system consists of a commercial-use game machine, a personal computer or a workstation, a display unit, and a sound output device.

Each of the above systems includes a controller operated by a game player, a recording medium on which game program data is recorded, a central processing unit (CPU) that controls the elements of the system to produce sound and images based on the game program data, a processor for creating images, a processor for producing sound, a cathode ray tube (CRT) for displaying images, and a speaker for outputting sound. As the above-described recording medium, a compact disc-read only memory (CD-ROM), a semiconductor memory, and a cassette that integrates a semiconductor memory are primarily used.

As one kind of the above game systems, video games in which a character displayed on a display unit conducts action, for example, half-pipe or figure skating, are considered. In this type of video game, the action of the character is required to be scored according to whether a game player operates an operation unit at a correct timing or an incorrect timing.

SUMMARY OF THE INVENTION

Accordingly, in view of the above background, it is an object of the present invention to provide a video game machine in which the action of a character can be suitably scored by determining whether a game player operates an operation unit at a correct timing or an incorrect timing, and also to provide an action scoring method for use in a video game, and a recording medium on which an action scoring program is recorded.

In order to achieve the above object, according to one aspect of the present invention, there is provided a video game machine including display means for displaying a moving character performing various actions at a predetermined action position in a game space. A plurality of operation means which are externally operable are provided. Operation-combination storage means stores a predetermined combination of operations, in correspondence with each of the actions, to be performed on a plurality of operation means selected from the plurality of operation means. Selection control means controls selection of at least one action from among the actions. Informing means informs the combination of operations corresponding to the selected action. Determining means makes a determination of whether the operations corresponding to the informed combination have been performed after the informing means has provided the information and before the character reaches the predetermined action position. Action conducting control means causes the character to conduct the action when the operations corresponding to the informed combination have been performed. Scoring control means scores the action in accordance with a result determined by the determining means.

According to another aspect of the present invention, there is provided an action scoring method for use in a video game in which a moving character displayed on display means conducts various actions at a predetermined action position in a game space. The action scoring method includes the steps of: informing a combination of operations to be performed on a plurality of operation means corresponding to an action selected from among the various actions; determining whether the operations corresponding to the informed combination have been performed after the information has been provided in the informing step and before the character reaches the predetermined action position; causing the character to conduct the action when the operations corresponding to the informed combination have been performed; and scoring the action by using a result determined by the determining means.

According to a further aspect of the present invention, there is provided a recording medium for recording an action scoring program for use in a video game in which a moving character displayed on display means conducts various actions at a predetermined action position in a game space. The action scoring program includes: an informing step of informing a combination of operations to be performed on a plurality of operation means corresponding to an action selected from among the various actions; a determining step of determining whether the operations corresponding to the informed combination have been performed after the information has been provided in the informing step and before the character reaches the predetermined action position; an action conducting step of causing the character to conduct the action when the operations corresponding to the informed combination have been performed; and a scoring step of scoring the action by using a result determined by the determining means.

With the above arrangement, the scoring result is variable according to whether the game player is able to operate the operation means at a correct timing or an incorrect timing, thereby making the game more enjoyable and entertaining.

In the aforementioned video game machine, the determining means may further detect a position of the character upon completion of the operations corresponding to the informed combination, and the scoring control means may perform scoring in accordance with the detected position relative to the predetermined action position.

The aforementioned video game machine may further include reference storage means for storing a reference operation time preset for the operation performed on each of the plurality of operation means. The determining means may further count an operation time required for the operations corresponding to the informed combination, and the scoring control means may perform scoring by using the reference operation time preset for the operations performed on the operation means included in the informed combination and by using the counted operation time.

With this arrangement, scores are variable in accordance with the time required from the start point to the end point of the operations, thereby enhancing the competitive atmosphere of the game.

Scoring may be performed by using the total reference operation time and the total operation time required for the entire operations. Alternatively, scoring may be performed by using the reference operation time for each of the operation means and the operation time required for the operation each of the operation means.

In the aforementioned video game machine, the determining means may count a loss time incurred between consecutive operations performed on the operation means included in the informed combination, and the scoring control means may perform scoring by using the reference operation time preset for the operation on the operation means included in the informed combination and by using the counted loss time.

With this arrangement, scores are variable according to whether the game player is able to operate the operation means quickly, thereby enhancing the competitive atmosphere of the game.

The aforementioned video game machine may further include point storage means for storing a point preset for the operation performed on each of the plurality of operation means. The scoring control means may perform scoring by adding the points preset for the operations performed on the operation means included in the informed combination.

With this arrangement, different points are stored according to the levels of difficulty in performing the operation means. Accordingly, scores are also variable according to the levels of difficulty in performing the operation means, thereby providing a video game having different levels of difficulty and a wide range of choice of actions.

In the aforementioned video game machine, the selection control means may control selection of a plurality of actions from among the various actions in correspondence with the order of actions. The informing means may inform, in accordance with the order of actions, the operations included in the informed combination corresponding to each of the selected actions. The determining means may make the above determination on each of the selected actions. The scoring control means may add the scoring results of the respective selected actions and outputs the totaled result.

With this arrangement, the game player is able to feel as if he/she performed various actions in the actual half-pipe competition, thereby making the game more enjoyable and entertaining.

DESCRIPTION OF THE PREFERRED EMBODIMENT

Figure 1:
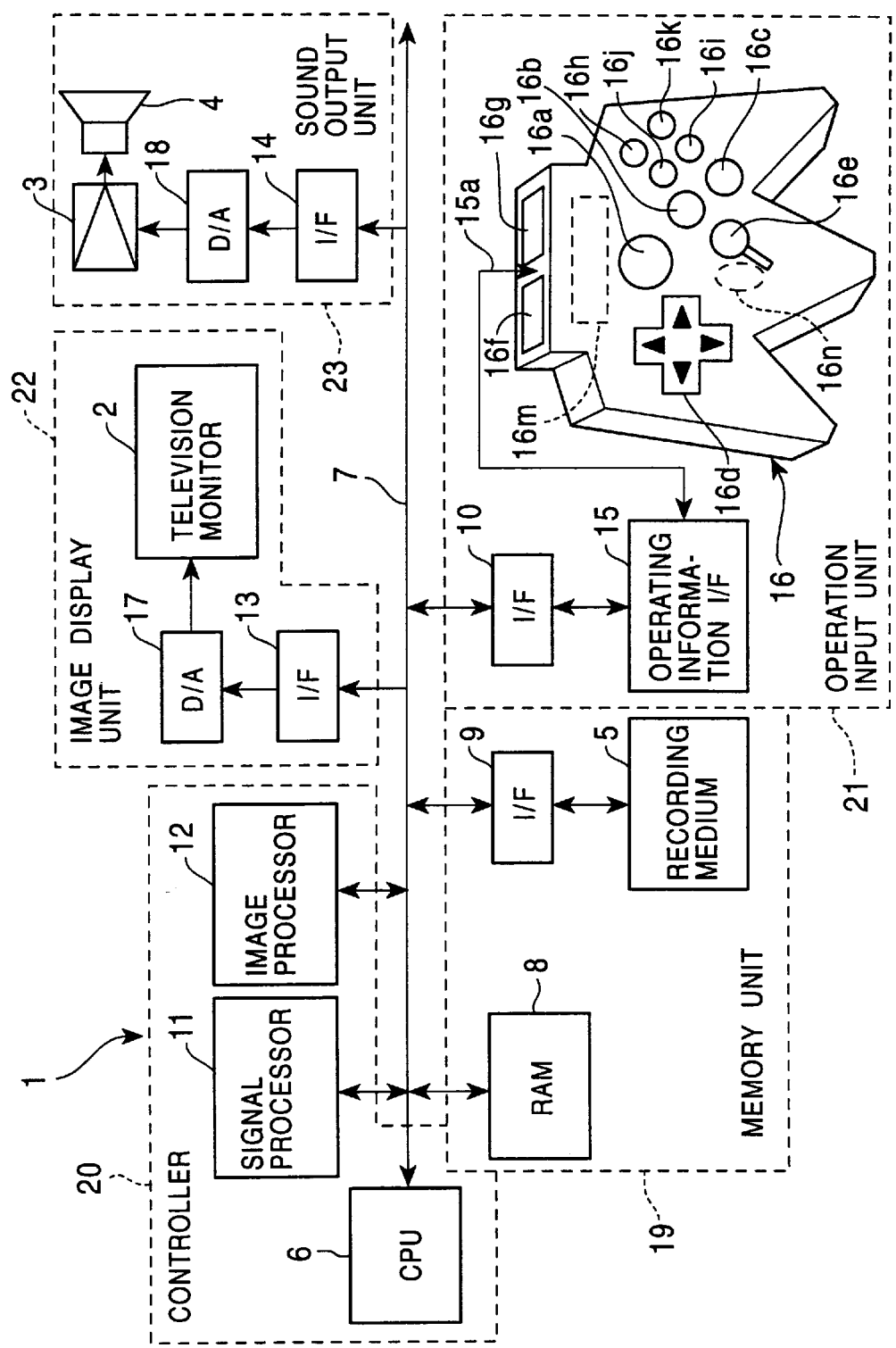
FIG. 1 is a block diagram illustrating a game system according to an embodiment of the present invention.

Referring to the block diagram illustrating an embodiment of the present invention shown in FIG. 1, a game system generally indicated by 1 is formed of a game machine unit, a television monitor 2 for outputting game images, an amplifying circuit 3 and a speaker 4 for outputting game sound, and a recording medium 5 on which game data including images, sound and program data is recorded. The recording medium 5 may be an optical disc, a flexible disk, or a ROM cassette in which a ROM storing, for example, the above game data and program data, such as an operating system, is accommodated within a plastic casing.

More specifically, the game machine unit is configured in the following manner. A bus 7 integrating an address bus, a data bus, and a control bus, is connected to a CPU 6. Connected to the bus 7 are a random access memory (RAM) 8, an interface circuit 9, an interface circuit 10, a signal processor 11, an image processor 12, an interface circuit 13, and an interface circuit 14. A controller 16 is connected to the interface circuit 10 via an operating information interface circuit 15. Digital-to-analog (D/A) converters 17 and 18 are connected to the interface circuits 13 and 14, respectively.

With the above arrangement, the RAM 8, the interface circuit 9, and the recording medium 5 form a memory unit 19. The CPU 6, the signal processor 11, and the image processor 12 form a controller 20 for controlling the progress of the game. The interface circuit 10, the operating information interface circuit 15, and the controller 16 form an operation input unit 21. The television monitor 2, the interface circuit 13, and the D/A converter 17 form an image display unit 22. The amplifying circuit 3, the speaker 4, the interface circuit 14, and the D/A converter 18 form a sound output unit 23.

The signal processor 11 primarily performs calculations for a three-dimensional space, calculations for transforming a three-dimensional space position into a pseudo-three-dimensional space position, calculations for the illuminant, and creating and processing sound data.

The image processor 12 writes image data into the RAM 8, for example, texture data to a specific area of the RAM 8 defined by a polygon, based on the calculations performed by the signal processor 11.

The controller 16, which forms an operation unit, has a start button 16a, an A button 16b, a B button 16c, a cross key 16d, a stick-type controller 16e, a left trigger button 16f, a right trigger button 16g, a C1 button 16h, a C2 button 16i, a C3 button 16j, a C4 button 16k, a connector 16m, an inward button 16n.

A memory device for temporarily storing, for example, the current setting of a game, is attachable to and detachable from the connector 16m. The stick-type controller 16e is configured substantially in a manner similar to a joystick. More specifically, the stick-type controller 16e has an erect stick, and tilts around a predetermined position of the stick in the area covering 360 degrees in the left and right directions and in the forward and backward directions. In accordance with the tilting direction and the tilting angle of the stick, the value on the X axis in the left and right directions and on the Y axis in the forward and backward directions around the erecting position of the stick, which serves as the origin, is output to the CPU 6 via the operating information interface circuit 15 and the interface circuit 10.

The configuration of the game system 1 varies according to the intended purpose of use. More specifically, if the game system 1 is for home use, the television monitor 2, the amplifying circuit 3, and the speaker 4 are provided separately from the game machine unit. On the other hand, if the game system 1 is for commercial use, all the elements shown in FIG. 1 are integrated into a single housing.

If the game system 1 is mainly formed by a personal computer or a workstation, the following elements are used in place of the above-described elements of the game system 1. A display unit for a computer or a workstation is substituted for the television monitor 2. Part of the game program data recorded on the recording medium 5 or hardware on an expansion board mounted on a computer expansion slot is used instead of the image processor 12. Hardware on an expansion board mounted on a computer expansion slot is substituted for the interface circuits 9, 10, 13, and 14, the D/A converters 17 and 18, and the operating information interface circuit 15. A particular area of a computer main memory or an expansion memory is used in place of the RAM 8.

In this embodiment, it is assumed that the game system 1 is for home use.

The schematic operation of the aforementioned game system 1 is described below.

A power switch (not shown) is turned on to activate the game system 1 to cause the CPU 6 to read images, sound, and the game program data from the recording medium 5 based on the operating system stored in the recording medium 5. The read images, sound, and game program data are entirely or partially stored in the RAM 8.

Thereafter, the CPU 6 proceeds with the game in accordance with the game program data stored in the RAM 8 and instructions provided by a game player via the controller 16. Namely, the CPU 6 suitably creates a command, which serves as a task for outputting a drawing or sound, based on the instructions provided by the game player via the controller 16.

The signal processor 11 performs calculations for character positions in a three-dimensional space (and in a two-dimensional space), calculations for the illuminant, and creating and processing sound data, based on the above-described command.

Subsequently, the image processor 12 writes image data into the RAM 8 based on the calculations performed by the signal processor 11. The image data is then supplied to the D/A converter 17 via the interface circuit 13 and is converted into an analog video signal. The video signal is further supplied to the television monitor 2 and is displayed on the screen.

Meanwhile, the sound data output from the signal processor 11 is supplied to the D/A converter 18 via the interface circuit 14 and is converted into an analog sound signal. The sound signal is then output from the speaker 4 as sound via the amplifying circuit 3.

The half-pipe performed in the game system 1 of this embodiment is briefly explained below. Half-pipe is a type of snow sport. In a generally semi-cylindrical (half-pipe) course, which has an overall tilt, a competitor on a snowboard snowboards from the top of the course, and gains speed, and performs stunts, such as jumping or rotating, at a course lip, thereby competing for difficulty and quality of the action.

In half-pipe, five judges award points from 1 to point 10 for the competitor's action in view of the respective five elements, such as technique, rotation, height, landing, and technical merit, and the ranking of the competitors is determined by the point totals. The "technique" applies to actions which do not contain rotation, and "rotation" applies to all actions which do contain rotation.

An example of the screen of this game system 1 is described hereinbelow with reference to FIGS. 2 through 5.

Figure 2:
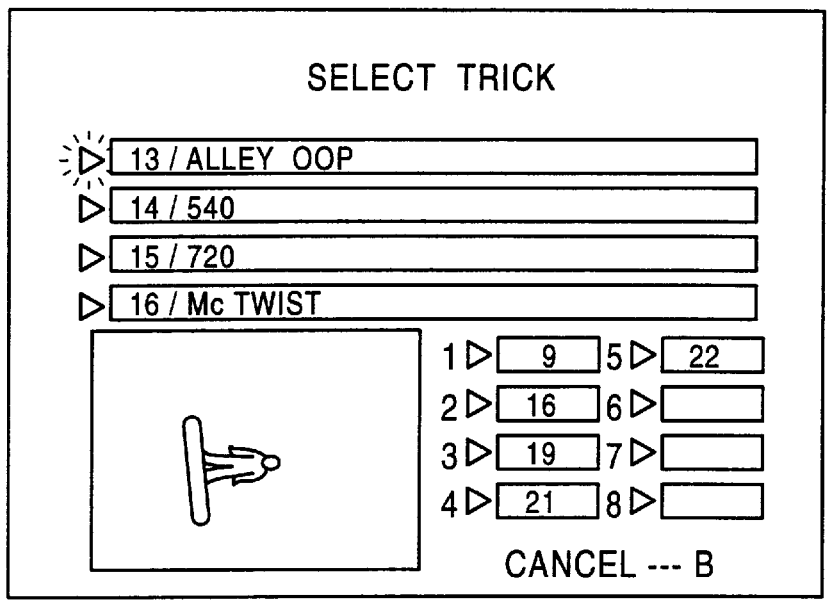
FIGS. 2 through 5 illustrate examples of a game screen.

FIG. 2 illustrates the screen displayed when an action is to be selected. Displayed on the upper portion of the screen is an action list consisting of action numbers from 1 to 30 to be selected by scrolling. One shot of the action selected by the cursor, in this example, action number 13, is shown on the lower left portion, and the action numbers which have already been selected are indicated on the lower right portion in chronological order. Eight actions can be selected in total, as shown in FIG. 2, and five actions have been selected so far.

Figure 3:
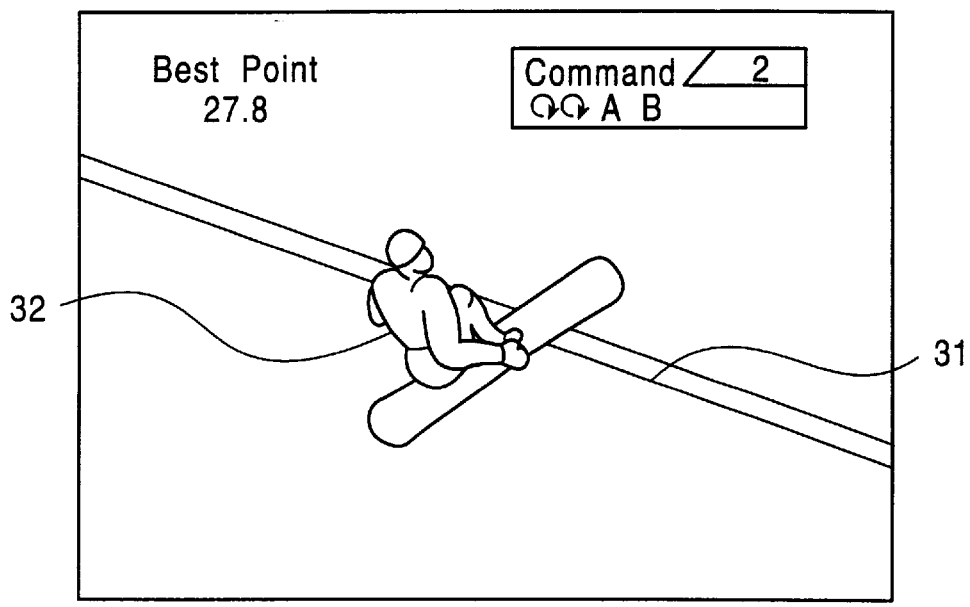

FIG. 3 illustrates the screen after the half-pipe action has been started and also illustrates the state immediately before a competitor 32 jumps from a course lip (action position) 31. The best point obtained so far is shown on the upper left portion of the screen, and the order of action and a combination (command) of operation keys to be operated are indicated on the upper right portion.

Figure 4:
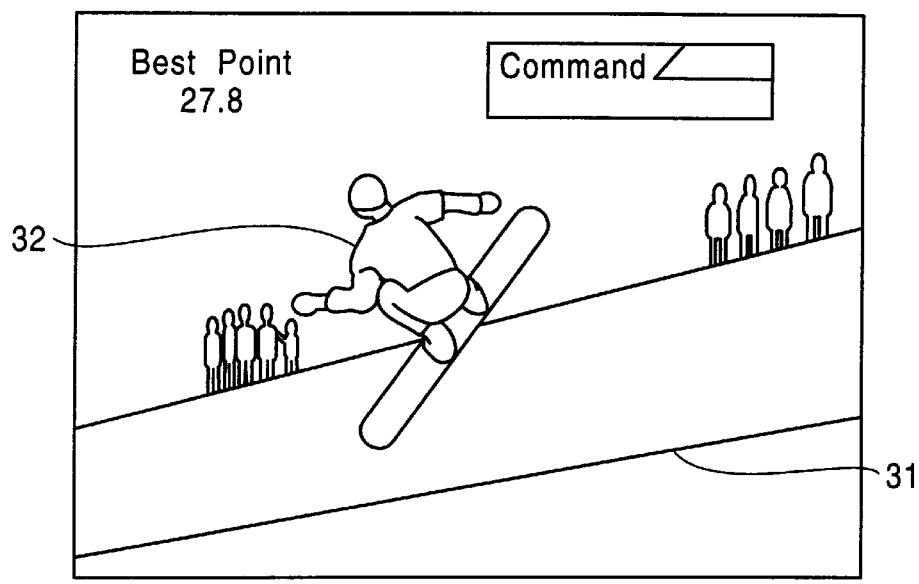

FIG. 4 illustrates the screen while the competitor 32 is conducting an action after jumping from the course lip 31. The command shown on the upper right portion of the screen has been erased when the competitor 32 was off the course lip 31.

Figure 5:
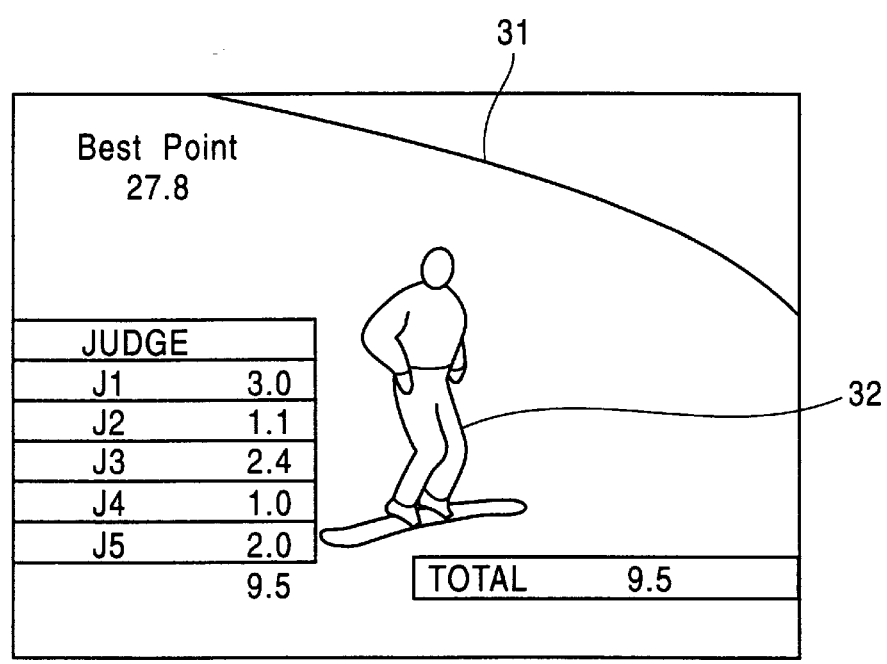

FIG. 5 illustrates the screen when all the actions have been completed. The scoring results (points) are indicated in the columns from J1 through J5 on the lower left portion of the screen, and the point total is shown on the lower right portion as TOTAL.

Figure 6:
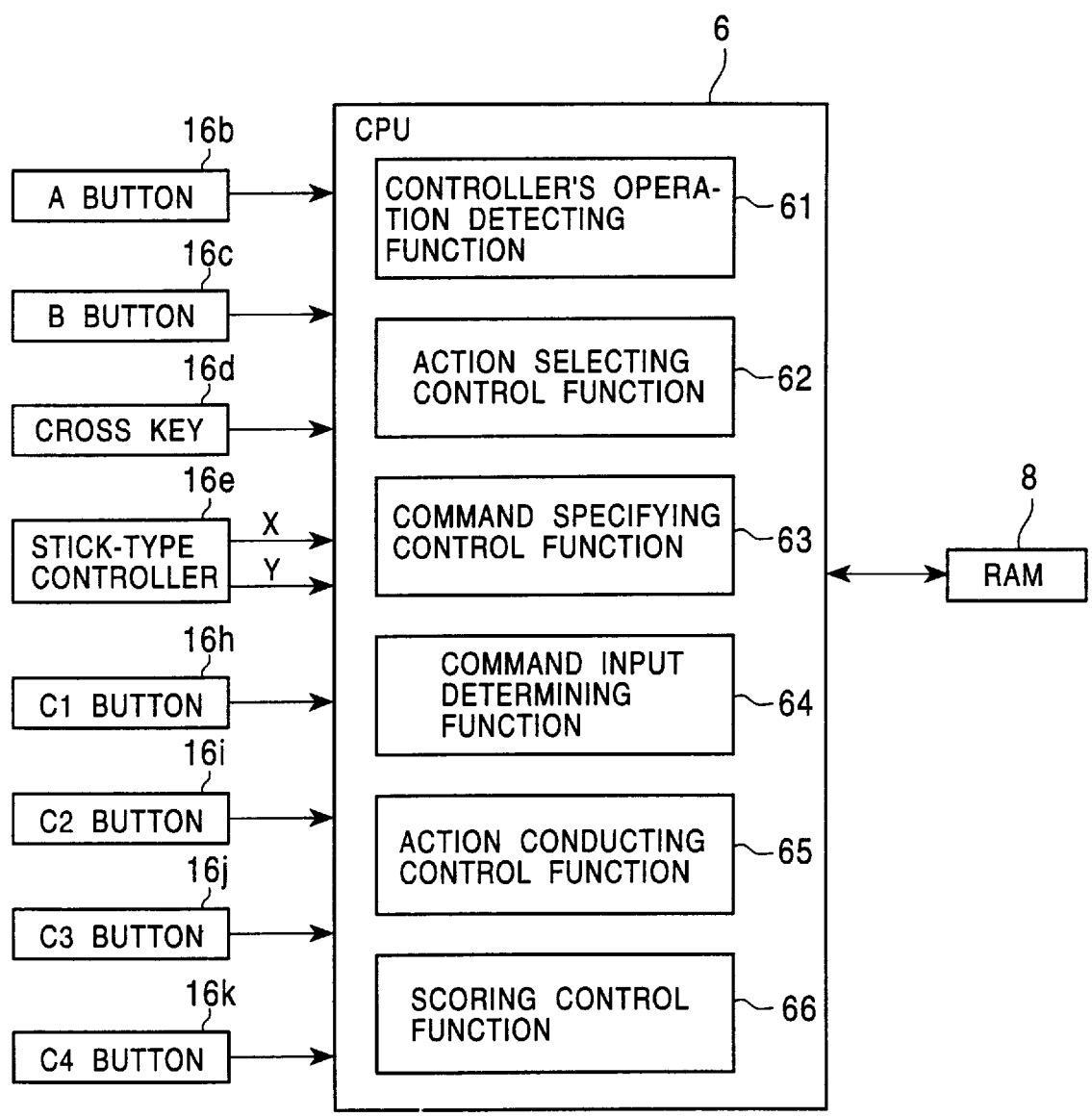
FIG. 6 is a block diagram illustrating functions of a CPU, a stick-type controller, and the individual buttons.

FIG. 6 is a block diagram illustrating the functions of the CPU 6, the RAM 8, the stick-type controller 16e, the cross key 16d, and the individual buttons 16b, 16c, 16h, 16i, 16j, and 16k. For simplified representation, the interface circuit 10, the operating information interface circuit 15, and the bus 7 are not shown.

Stored in the recording medium 5 are a predetermined number of combinations of the operation keys of the controller 16, i.e., the stick-type controller 16e and the individual buttons 16b, 16c, 16h, 16i, 16j, and 16k, corresponding to the various actions conducted in half-pipe competition.

For example, action number 16 "McTWIST" shown on the action selecting screen in FIG. 2 has a combination of four operations, such as "moving the stick-type controller 16e around a full circle clockwise", "moving the stick-type controller 16e around a full circle clockwise again", "pressing the A button 16b", and "pressing the B button 16c".

As a total, for example, 30 actions are set by using 30 combinations of the seven operation keys. The difficulty of operation is varied according to the number of operation keys or whether or not the stick-type controller 16e is used.

The CPU 6 includes, as illustrated in FIG. 6, a controller's operation detecting function 61, an action selecting control function 62, a command specifying control function 63, a command input determining function 64, an action conducting control function 65, and a scoring control function 66.

The controller's operation detecting function 61 determines the one/off operations of the individual buttons 16b, 16c, 16h, 16i, 16j, and 16k and also detects the values of the X- and Y- coordinates corresponding to the tilting direction and the tilting angle of the stick provided for the stick-type controller 16e.

The action selecting control function 62 causes the display unit to display the action selecting screen illustrated in FIG. 2 and urges the game player to select the action before the competition is started. The action can be selected by moving the cursor by shifting the cross key 16d in the upward and downward direction and by further scrolling the action list in the upward and downward direction. The action designated by the cursor is then determined by pressing the A button 16b. The selected action can be canceled by pressing the B button 16c. When all the actions have been selected, the A button 16b is activated to erase the display of the action selecting screen, and the process is shifted to start the competition.

The command specifying control function 63 specifies a command representing a combination of operations to be performed by the game player and indicates the command corresponding to the selected action, as indicated on the upper right portion of the screen in FIG. 3. By using this command, the competitor 32, who has snowboarded the course and has reached a predetermined distance from the course lip 31, conducts an action at the course lip 31.

For example, as noted above, in FIG. 3, a combination of four operations, such as "moving the stick-type controller 16e around a full circle clockwise", "moving the stick-type controller 16e around a full circle clockwise again", "pressing the A button 16b", and "pressing the B button 16c", corresponding to action number 16 selected as the second action is shown.

The command input determining function 64 determines whether the designated command has been input before the competitor 32 has reached the course lip 31 (FIG. 3). The action conducting control function 65 controls the competitor 32 displayed on the screen to conduct the selected action if the command has been input.

The scoring control function 66 scores the action conducted by the competitor 32 in view of the following five elements.

Figure 7:
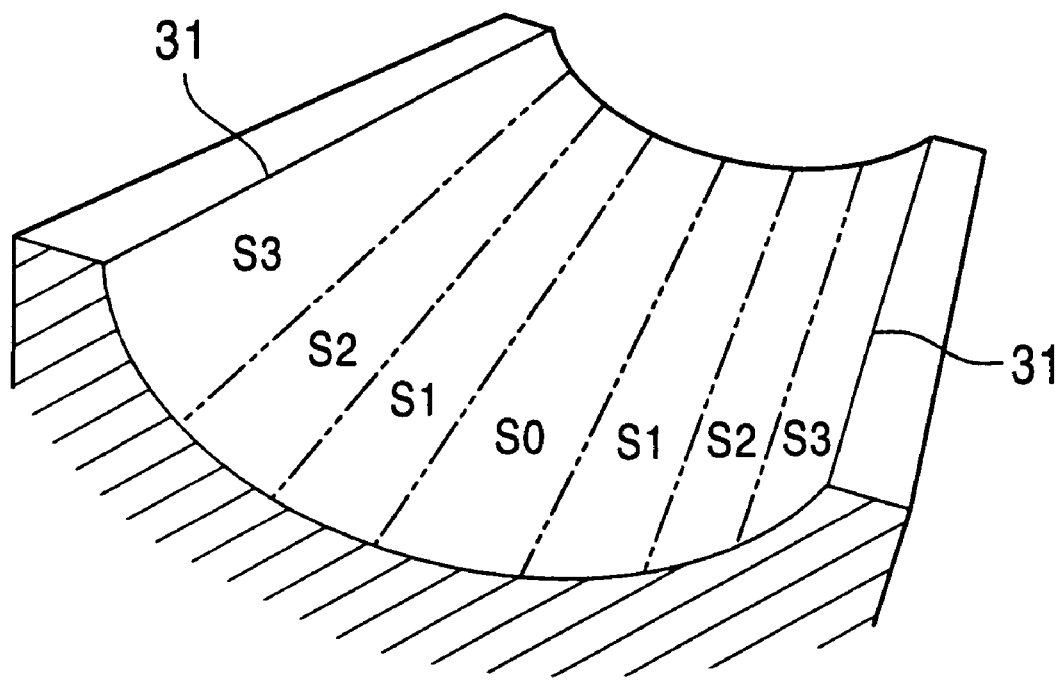
FIG. 7 is a schematic view of the half-pipe course illustrating a scoring method.

1. Adding the points preset for the techniques that do not include rotation and performs calculation to obtain the average of the added points after all the technique actions have been completed. For example, two points are set for the input operation on each of the buttons 16b, 16c, 16h, 16i, 16j, and 16k, and every time each button is pressed, two points are added.
2. Adding the points preset for rotation actions and performing calculation to obtain the average of the added points after all the rotation actions have been completed. For example, five points are set for each of the clockwise operation and the counterclockwise operation on the stick-type controller 16e, and every time each operation is performed, five points are added.
3. As indicated by the two-dot-chain lines in FIG. 7 schematically illustrating the half-pipe course, the half-pipe course of this embodiment is partitioned into zones S0 through S3, each having a predetermined width. The zone S0 corresponds to the bottom of the course; the zones S1 and S2, which are provided at both sides of the zone S0, correspond to the transition of the course; and the zones S3, which are each sandwiched between the zone S2 and the course lip 31, correspond to the vertical section of the course. The coefficients 0 through 3 are set for the zones S0 through S3, respectively.

Upon inputting a command, the height of the position of the competitor 32 relative to the reference point that is preset for the course is multiplied by the coefficient set for the zone at which the competitor 32 is positioned. The resulting values (points) are added every time the action is conducted, and when all the actions are completed, the average of the added points is obtained.

4. A reference operation time is preset in units of frames for each operation key of the controller 16. For example, the reference operation time for five frames is set for each input operation on the A button 16b, the B button 16c, the C1 button 16h, the C2 button 16i, the C3 button 16j, and the C4 button 16k. The reference operation time for fourteen frames is set for each of the clockwise operation and the counterclockwise operation on the stick-type controller 16e. A longer reference operation time is set for a higher level of difficulty in operating an operation key.

The action by the competitor 32 is then scored in terms of the time required for inputting the command relative to the total reference operation time. One frame is equivalent to 1/60 of a second.

For example, the total reference operation time for action number 9 is calculated as follows.

$$14+14+5+5=38$$

If the command is input within 38 frames, full marks, for example, five points, are obtained. If the time required for inputting the command is 50 frames, 38/50×5 is calculated to result in 3.8 points. In this scoring method, the points are also added every time the action is conducted, and the average of the added points is then obtained upon completion of all the actions.

5. A time difference between the start times of the individual operations required for inputting a command is considered in awarding points. That is, the ratio of the total reference operation time for inputting the command to the total time differences of the individual operations is multiplied by full marks, for example, five points.

For example, in action number 16, it is determined that the start point of the operation "moving the stick-type controller 16e around a full circle clockwise" is t1; the start point of the subsequent operation "moving the stick-type controller 16e around a full circle clockwise" is t2; the start time of the operation "pressing the A button 16b" is t3; and the start time of the operation "pressing the B button 16c" is t4. The time differences of the individual operation start times are t2−t1=15, t3−t2=25, t4−t3=5 (frames). Accordingly, the above-described ratio is calculated as follows.

$$(14+14+5+5)/(15+25+5) \times 5 = 4.2 \quad (1)$$

In this scoring method, the points are also added every time the action is conducted, and the average of the added points is obtained after all the actions have been completed.

The scoring control function 66 adds the points obtained according to the aforementioned methods (1) through (5) upon completion of all the actions, and also instructs the signal processor 11 (FIG. 1) to display the individual scoring results and the point total on the screen. Then, the individual points obtained according to the methods (1) through (5) are indicated, as illustrated in FIG. 5, under the columns of J1 through J5, and the point total (TOTAL) is shown at the lower right portion of the screen.

Figure 8:
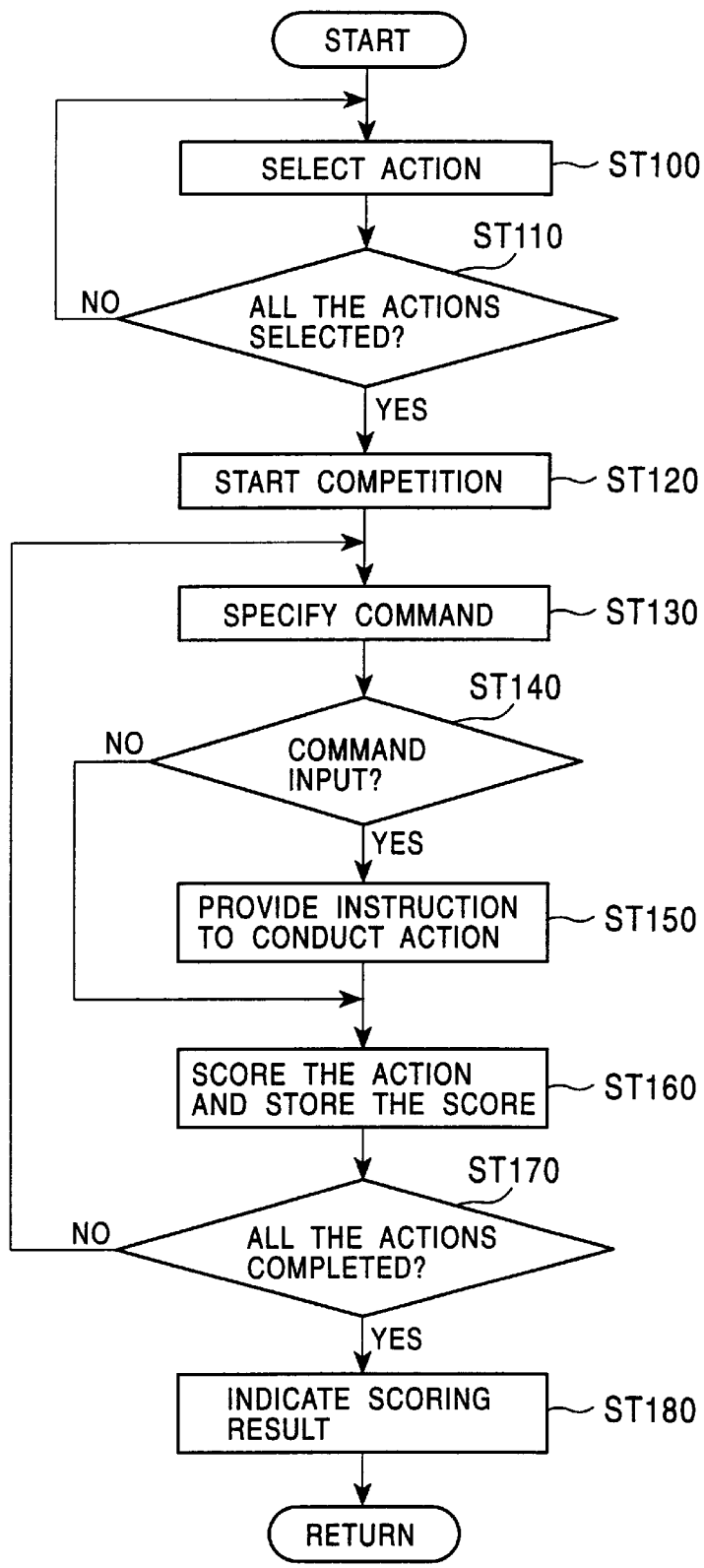
FIG. 8 is a flow chart illustrating a process of the scoring method.

The process of the above-described scoring operation is described below according to the flow chart of FIG. 8 while referring to FIGS. 2 through 6.

The action selecting screen is first displayed, as illustrated in FIG. 2, and the action is selected in step ST100. It is then determined in step ST110 whether the selecting operation has been completed. If the outcome of step ST110 is no, step ST100 is repeated until all the eight actions have been selected.

If all the eight actions have been selected and the A button 16b has been activated, a competition is started, and the competitor 32 begins to snowboard on the half-pipe in step ST120.

When the competitor 32 has reached a predetermined position, the command to be operated is shown on the upper right portion of the screen, as shown in FIG. 3, in step ST130. A determination is then made in step ST140 of whether the command has been input. If the outcome of step ST140 is yes, the execution of the action is instructed, and the action is conducted, as shown in FIG. 4, in step ST150. The action is then scored, and the scoring result is stored in the RAM 8 in step ST160.

Conversely, if it is found in step ST140 that the command has not been input before the competitor 32 has reached the course lip 31, as illustrated in FIG. 3, the scoring result is stored in the RAM 8 as zero points in step ST160.

Subsequently, it is checked in step ST170 whether all the eight actions have been completed. If the result of step ST170 is no, the process returns to step ST130, and the processing in step ST130 and the following steps is repeated. When all the actions have been completed in step ST170, the scoring result is indicated, as shown in FIG. 5, instep ST180, and the process is ended.

As discussed above, according to the foregoing embodiment, a combination of operation keys, i.e., a command, is indicated on the screen. It is then determined whether the command has been input, and scoring is performed according to whether or not the command has been input at a suitable timing. Thus, the scoring result is variable according to whether the command has been input at a correct timing or an incorrect timing, thereby making the video game more enjoyable and entertaining.

Additionally, the game player is required to input various commands, thereby enhancing the competitive atmosphere of the video game. The content of the command is not shown on the action selecting screen, but is disclosed immediately before the action is started. The game player is thus required to understand the content of the command quickly, thereby enhancing the competitive atmosphere of the video game.

The present invention is not restricted to the foregoing embodiment, and the following modifications (1) through (3) may be possible.

(1) In the above-described embodiment, half-pipe is performed in the game system 1. However, any type of video game may be performed, for example, figure skating or aerial stunts, as long as a moving character displayed on a display unit conducts an action at a predetermined position in correspondence with a combination of operation keys.

(2) The scoring control function 66 may use the following method in place of scoring method 5. The loss times incurred between consecutive operations on the operation keys for inputting the command may be considered in scoring. The ratio of the total reference operation time to the total loss time may be multiplied by full marks, for example, five points.

For example, in action number 16, it may be determined that the end point of the operation "moving the stick-type controller 16e around a full circle clockwise" is till the start point and the end point of the subsequent operation "moving the stick-type controller 16e around a full circle clockwise" are t12 and t13, respectively; the start time and the end time of the operation "pressing the A button 16b" are t14 and t15, respectively; and the start time of the operation "pressing the B button 16c" is t16. The individual loss times are t12−t11=15, t14−t13=25, t16−t15=5 (frames). Accordingly, the above-described ratio is calculated as follows.

$$(14+14+5+5)/(15+25+5) \times 5 = 4.2 \qquad (2)$$

In this modification, the points are also added every time the action is conducted, and the average of the added points is obtained after all the actions have been completed.

(3) The method of scoring the actions by the scoring control function 66 is not restricted to the above methods, and various methods may be considered. For example, in the scoring method 4 of the foregoing embodiment, the total operation time required for inputting the command is compared with the total reference operation time. Instead, the time required for the operation performed on each operation key may be compared with the corresponding reference operation time.

Additionally, in the foregoing embodiment, the different reference operation times are set according to the levels of difficulty in operating the corresponding operation keys. However, all the reference operation times may be set to be uniform regardless of the operation key, and the coefficients may be set according to the levels of difficulty in operating the operation keys. Then, the ratio of the reference operation time to the time required for operating the corresponding operation key may be multiplied by the corresponding coefficient.

As described above, according to the video game machine of the present invention, a moving character displayed on a display unit conducts various actions at a predetermined action position in a game space. A combination of operations to be performed on a plurality of operation keys corresponding to the action selected from a plurality of actions is informed. It is then determined whether the input operation corresponding to the informed combination has been performed before the character has reached a predetermined action position. If the above input operation has been performed in time, an instruction is provided to cause the character to conduct the corresponding action. The action is then scored according to the results judged by the judging function. With this arrangement, the point total is variable according to whether the game player operates the operation keys at a correct timing or an incorrect timing, thereby making the video game more enjoyable and entertaining.

The character's position determined upon completing the input operation corresponding to the informed combination is detected, and scoring is performed in accordance with the detected position relative to the predetermined action position. Accordingly, the point total is variable according to whether or not the game player operates the operation keys quickly, thereby enhancing the competitive atmosphere of the video game.

The reference operation time preset for the input operation on each operation unit is stored in a storage unit, and the actual time required for performing the operation corresponding to the information combination is counted. Scoring is then performed by comparing the counted operation time with the total reference operation time stored in the storage unit. Thus, the point total is variable in accordance with the time taken from the start point to the end point of the operation, thereby improving the competitive atmosphere of the video game.

The loss time between the consecutive operations performed on the operation keys corresponding to the informed combination is counted. Scoring is then performed by comparing the total loss time with the total reference operation time preset for the operations on the operation keys corresponding to the informed combination. This makes it possible to vary the point total according to whether or not the game player operates the operation unit quickly, thereby enhancing the competitive atmosphere of the video game.

The point preset for the operation performed on each operation key is stored in a storage unit. Scoring is then performed by adding the points every time the operation key is operated for the command input. With this arrangement, the point total is varied in accordance with the level of difficulty in operating the operation key, thereby improving the competitive atmosphere of the video game.

A plurality of actions are selected from a list of various actions in correspondence with the order of the actions. Then, a combination of operations corresponding to each of the selected actions is informed. The action conducted by the competitor is then judged. The points for the respective actions are added and output. With this arrangement, the game player is able to feel as if he/she performed various actions in the actual half-pipe competition, thereby making the game more enjoyable and entertaining.

What is claimed is:

1. A video game machine comprising:
   display means for displaying a moving character performing various actions at a predetermined action position in a game space;
   a plurality of operation means which are externally operable;
   operation-combination storage means for storing a predetermined combination of operations, in correspondence with each of said actions, to be performed on a plurality of operation means selected from said plurality of operation means;
   selection control means for controlling selection of at least one action from among said actions;
   informing means for informing said combination of operations corresponding to the selected action;
   determining means for making a determination of whether the operations corresponding to the informed combination have been performed after said informing means has provided the information and before said character reaches the predetermined action position;
   action conducting control means for causing said character to conduct the action in a case where the operations corresponding to the informed combination have been performed; and
   scoring control means for scoring the action in accordance with a result determined by said determining means.

2. A video game machine according to claim 1, wherein said determining means further detects a position of said character upon completion of the operations corresponding to the informed combination, and said scoring control means performs scoring in accordance with the detected position relative to the predetermined action position.

3. A video game machine according to claim 2, further comprising reference storage means for storing a reference operation time preset for the operation performed on each of said plurality of operation means,
   wherein said determining means further counts an operation time required for the operations corresponding to the informed combination, and said scoring control means performs scoring by using the reference operation time preset for the operations performed on said operation means included in the informed combination and by using the counted operation time.

4. A video game machine according to claim 3, wherein said determining means counts a loss time incurred between consecutive operations performed on said operation means included in the informed combination, and said scoring control means performs scoring by using the reference operation time preset for the operation on said operation means included in the informed combination and by using the counted loss time.

5. A video game machine according to claim 1, further comprising reference storage means for storing a reference operation time preset for the operation performed on each of said plurality of operation means,
   wherein said determining means further counts an operation time required for the operations corresponding to the informed combination, and said scoring control means performs scoring by using the reference operation time preset for the operations performed on said operation means included in the informed combination and by using the counted operation time.

6. A video game machine according to claim 1, further comprising point storage means for storing a point preset for the operation performed on each of said plurality of operation means,
   wherein said scoring control means performs scoring by adding the points preset for the operations performed on said operation means included in the informed combination.

7. A video game machine according to claim 1, wherein said selection control means controls selection of a plurality of actions from among said various actions in correspondence with the order of actions, said informing means informs, in accordance with the order of actions, the operations included in the informed combination corresponding to each of the selected actions, said determining means makes said determination on each of the selected actions, and said scoring control means adds the scoring results of the respective selected actions and outputs the totaled result.

8. An action scoring method for use in a video game in which a moving character displayed on display means conducts various actions at a predetermined action position in a game space, said method comprising the steps of:
   informing a combination of operations to be performed on a plurality of operation means corresponding to an action selected from among said various actions;
   determining whether the operations corresponding to the informed combination have been performed after the information has been provided in said informing step and before said character reaches the predetermined action position;
   causing said character to conduct the action in a case where the operations corresponding to the informed combination have been performed; and
   scoring the action by using a result determined by said determining means.

9. A recording medium for recording an action scoring program for use in a video game in which a moving character displayed on display means conducts various actions at a predetermined action position in a game space, said action scoring program comprising:
   an informing step of informing a combination of operations to be performed on a plurality of operation means corresponding to an action selected from among said various actions;
   a determining step of determining whether the operations corresponding to the informed combination have been performed after the information has been provided in said informing step and before said character reaches the predetermined action position;
   an action conducting step of causing said character to conduct the action in a case where the operations corresponding to the informed combination have been performed; and
   a scoring step of scoring the action by using a result determined by said determining means.

* * * * *